No. 715,727.  
Patented Dec. 9, 1902.  
W. J. WRIGHT.  
REVERSIBLE CLUTCH MECHANISM.  
(Application filed Feb. 13, 1902.)

(No Model.)  
3 Sheets—Sheet 1.

WITNESSES:  
INVENTOR  
William J. Wright

No. 715,727. Patented Dec. 9, 1902.
W. J. WRIGHT.
REVERSIBLE CLUTCH MECHANISM.
(Application filed Feb. 13, 1902.)
(No Model.) 3 Sheets—Sheet 2.

WITNESSES:
Guy W. Worthington
Louis Dieterich

INVENTOR
William J. Wright
BY
Fred G. Dieterich & Co.
ATTORNEYS

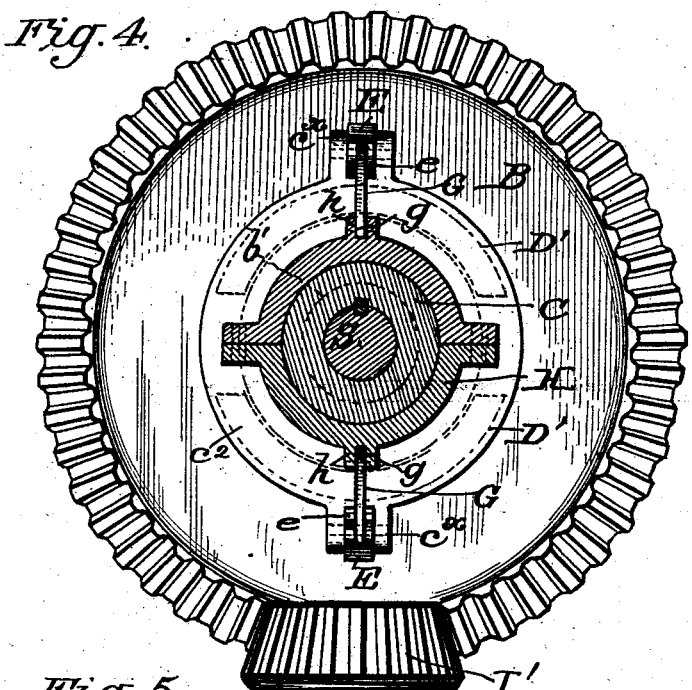
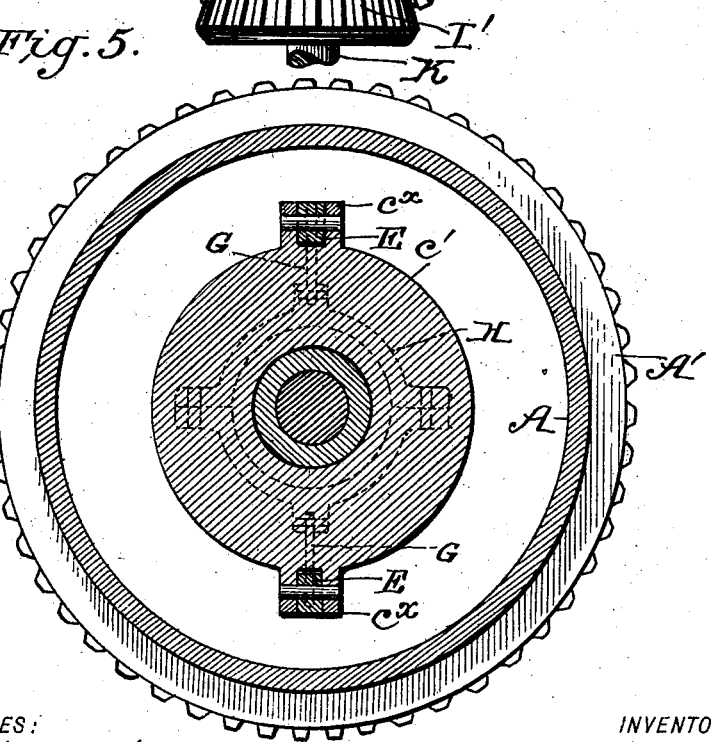

UNITED STATES PATENT OFFICE.

WILLIAM J. WRIGHT, OF PITTSBURG, PENNSYLVANIA, ASSIGNOR OF THREE-SIXTEENTHS TO J. W. LEE AND FRED J. GALLOWAY, OF PITTSBURG, PENNSYLVANIA.

REVERSIBLE CLUTCH MECHANISM.

SPECIFICATION forming part of Letters Patent No. 715,727, dated December 9, 1902.

Application filed February 13, 1902. Serial No. 93,828. (No model.)

*To all whom it may concern:*

Be it known that I, WILLIAM J. WRIGHT, residing at Pittsburg, in the county of Allegheny and State of Pennsylvania, have invented a new and Improved Reversible Clutch Mechanism, of which the following is a specification.

My invention seeks to provide a new and effective means adapted to coöperate with the drive-shaft of an explosive or other engine for reversing the movement of a belt or gear driving-wheel mounted upon said drive-shaft; and the said invention comprehends generically a belt-pulley or gear wheel loosely mounted on the drive-shaft, a second gear or pulley opposing the other pulley or gear loosely mounted on the drive-shaft adjacent to said other pulley or gear, and a duplex set of clutch members, one for each belt pulley or wheel, coöperatively joined with a single shifting means common to both pulleys or gears for shifting alternately into or out of a fixed connection with the drive-shaft or both pulleys or gears to a loose position.

In its more subordinate features my invention consists in certain details of construction and peculiar combination of parts, all of which will hereinafter be fully explained, and specifically pointed out in the appended claims, reference being had to the accompanying drawings, in which—

Figure 1:
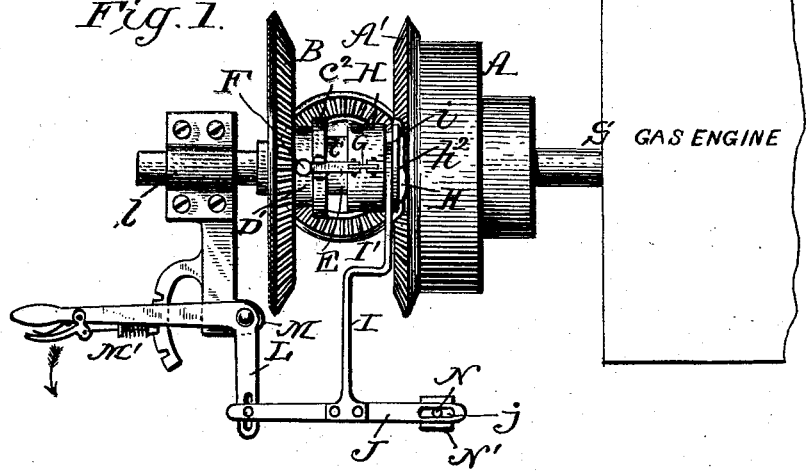
Figure 3:
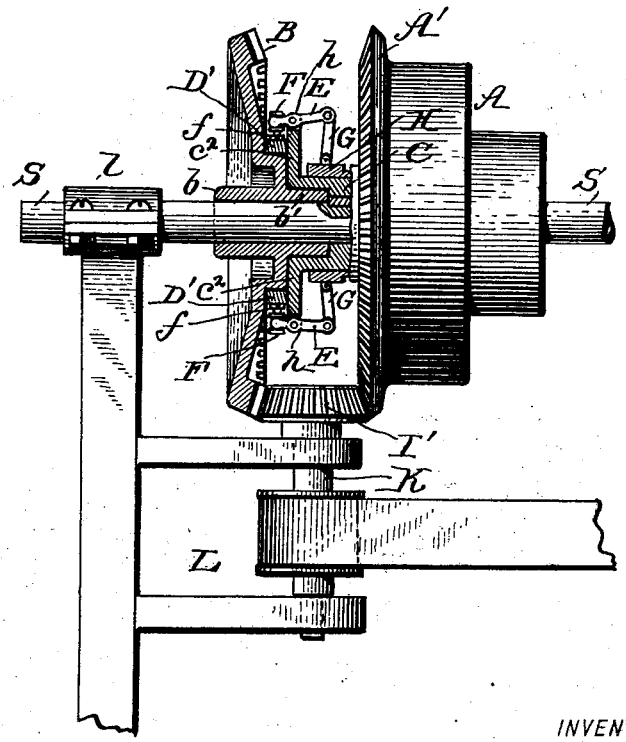
Figure 2:
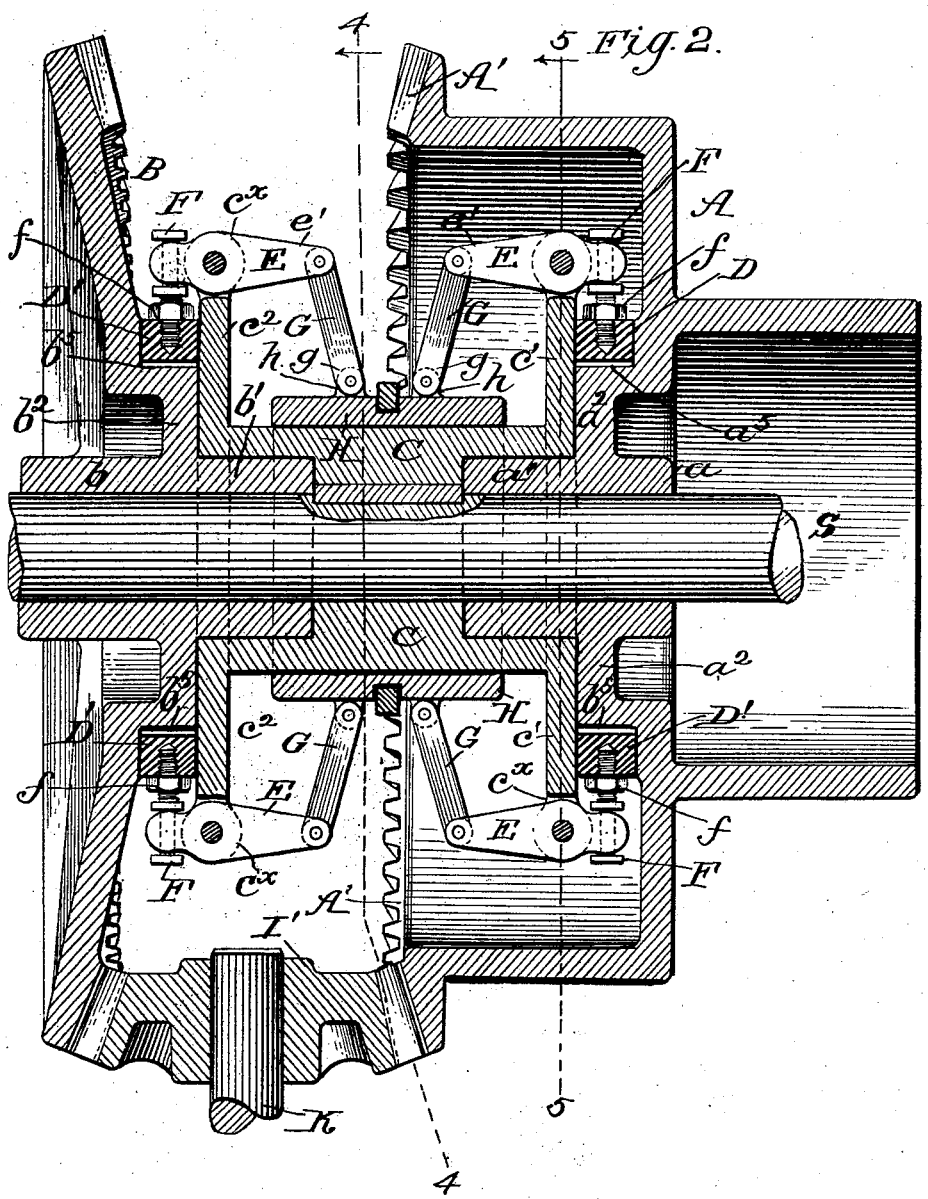

Figure 1 is a plan view of a portion of a gas-engine with my improved reversible clutch mechanism applied. Fig. 2 is a vertical section of my reversible clutch mechanism, the several parts being adjusted to leave both pulleys or gears free to run loosely on the drive-shaft. Fig. 3 is a view, on a reduced scale, showing one pulley or gear in section and the clutch devices shifted to make said pulley fast to the shaft, the other (loosely held) pulley being shown in elevation. Fig. 4 is a cross-section taken substantially on the line 4 4 of Fig. 2, and Fig. 5 is a similar view taken practically on the line 5 5 of Fig. 2.

In the drawings like letters indicate like parts in all the figures, and by referring now more particularly to Fig. 1 it will be noticed I have shown my improved clutch mechanism as applied to the drive-shaft S of a gas-engine, (designated by G;) but I desire it understood my improvements may be applied to a drive-shaft of any type of engine.

When equipped with my improved mechanism, the drive-shaft S is extended, and the extended portion may be provided with a supplemental bearing or bearings, as the character of the work for which the said mechanism is to be used may make necessary.

Upon the shaft S is loosely mounted a belt-pulley A, and adjacent said pulley and opposing the same is a drive-gear B, the two being of like diameter, the pulley A being also provided with a gear-rim $A'$, facing the gear B, and, if desired, the gear B may also be provided with a belt-receiving annulus. The gear members A and B each have a hub $a\ b$, slidably mounted upon the shaft S, and the inner portions $a'\ b'$ of said hubs form the bearing-surfaces for the opposite ends of the tubular or spindle member C, having at each end annular enlargements or disk portions $c'$ $c^2$, one of which is adjacent to and abuts a web $a^2$, of the pulley or gear member A, the other similarly abuts the web $b^2$ of the gear or pulley B, and at diametrically opposite points the disks $c'\ c^2$ have bifurcated radial extensions $c^\times$, the reason for which will presently appear. The spindle C is keyed to the shaft S to turn therewith at all times, (see Fig. 2,) and each drive gear or pulley A and B has an annular brake-rim $a^5 b^5$, with which coöperate the segmental brake-shoes D D', a plurality of which is used with each drive pulley or gear, two being shown in the drawings for each pulley A and B, disposed at diametrically opposite points, as clearly shown in Figs. 2 and 3. The brake-shoes D D' are each suspended on the inner or short end of a lever E, fulcrumed in the bifurcated ends of the extensions $c^\times$ of the members $c'\ c^2$, to which ends they are adjustably joined by the screw-studs F F, having adjusting-nuts $f$, as shown. To the outer or long ends $e'$ of the levers E are pivotally joined link members G, the ends $g$ of which are pivotally connected to the ears $h\ h$ on the sleeve H, mounted upon the member C and endwise shiftable thereon by any suitable means, preferably by a forked lever I, having its inner end $i$ formed to engage the central annular groove $h^2$ in the sleeve H, as best shown in Fig. 1, by reference to which it will be seen the lever I is fixedly connected to a bar or lever-arm J, shiftable in a plane parallel with the drive-shaft S, one end thereof being slotted longitudinally, as at $j$, to coöperate with a guide-stud N on a standard N' and its other end pivotally connected to one end of a bell-crank handle L, fulcrumed on a post M and having a rack-and-pawl connection M' of any approved construction, the arrangement of the several parts being such that by moving the handle to one position the arm J will be shifted in the direction indicated by the arrow $x$ to clutch the pulley A to turn with the shaft S, when turned in the other direction, to free such pulley A from turning with the shaft and clutch the pulley or gear B with said shaft, and when turned to an intermediate position to set both pulleys A and B to turn loosely on the shaft, such relative adjustment of the two pulleys or gears A and B being provided for by reason of the peculiar correlative arrangement of the endwise-slidable sleeve H, the levers E, links G, and the shoes D, the fulcrum-points of the links G with the members E and H being such that when adjusted to bring either set of the shoes D into a tight frictional engagement with the drive-wheel it is desired to make fast with the shaft the said levers and links E and G will be automatically held to their shoe-clutching position, as will be readily understood by reference to Fig. 3, in which the gear-wheel B is shown clutched with the shaft S to turn therewith and the wheel A held to turn loosely thereon.

By providing the pulley A with a gear-rim A', similar to the gear-rim B' on the member B, the two members A and B can be readily connected by means of a bevel-pinion I, mounted on a short stub-shaft K, journaled in a bearing on the bracket-piece L, that carries a bearing $l$ for the shaft S. The shaft K carries a drive-pulley $k$ for power-transmitting purposes. (See Fig. 3.)

From the foregoing description, taken in connection with the accompanying drawings, it is thought the complete operation and the advantages of my invention will be readily apparent. In the practical application of the same by shifting the clutch-lever devices to make the gear member B fast with the shaft motion will be imparted to the pulley A in a direction opposite to the rotation of the drive-shaft and by shifting the clutch devices in the extreme opposite direction the pulley A will be made fast to the shaft S to turn therewith and the pulley or gear left to run idly on the said shaft S in a direction opposite to its rotation, it being understood that if either one of the members A and B is fast to the shaft S motion (in opposite directions) will be imparted to the shaft K, which will also remain idle in case the clutch devices are shifted to an intermediate position, (see Fig. 2,) when both members A and B are loosely held on the shaft S and held from rotation.

While I have shown and described my reversible clutch mechanism as especially adapted for explosive-engines, it is manifest the same may be utilized on any engine-shaft especially adapted for hoisting purposes or for operating oil-well pump-rigging, the several parts constituting my improved reverse mechanism being of such character as to admit of their being readily attached to the ordinary gas or other engine shafts and joined with ordinary types of pump or other hoisting rigging without requiring any material change of their present construction.

Having thus described my invention, what I claim, and desire to secure by Letters Patent, is—

1. A clutch mechanism, comprising in combination, with a drive-shaft, two opposing pulleys loosely mounted on the shaft, an intermediate gear meshing with the said pulleys, each of said pulleys having an annular brake-surface, a sleeve C disposed between the pulleys keyed upon the shaft, said sleeve C having an annular disk portion at each end extending beyond the brake-surfaces of the pulleys, the sleeve H, slidable upon the sleeve C, the levers E, fulcrumed in the peripheral edge of the annular disk portions, the brake-shoes D, suspended from the outer end of the said levers to engage with the brake-surfaces of the pulleys, the links G for joining the inner ends of the levers E with the sliding sleeve H, and means for shifting said sleeve H, substantially as shown and described.

2. The combination with the shaft S, and the pulleys A and B loosely mounted thereon, said pulleys having opposing gear-rims, and each having an annular brake-rim $a^5$ $b^5$; of the sleeve C fixedly mounted on the shaft S, between the pulleys A and B, said sleeve having annular portions $c'$ $c^2$, having one or more radial extensions $c^\times$, the levers E fulcrumed in the extensions $c^\times$, the shoes D, and the adjustable shoe-hanger F, mounted on the outer ends of the levers E, the sleeve H, endwise slidable on the member C, the links G, joining with the sleeve and the inner end of the levers E, and means for shifting the sleeve H, all being arranged substantially as shown and for the purposes described.

WILLIAM J. WRIGHT.

Witnesses:
JOHN L. FLETCHER,
A. E. DIETERICH.